June 14, 1955 F. K. H. NALLINGER 2,710,600
AIR INJECTION SYSTEM FOR INTERNAL COMBUSTION ENGINES
Filed May 31, 1951
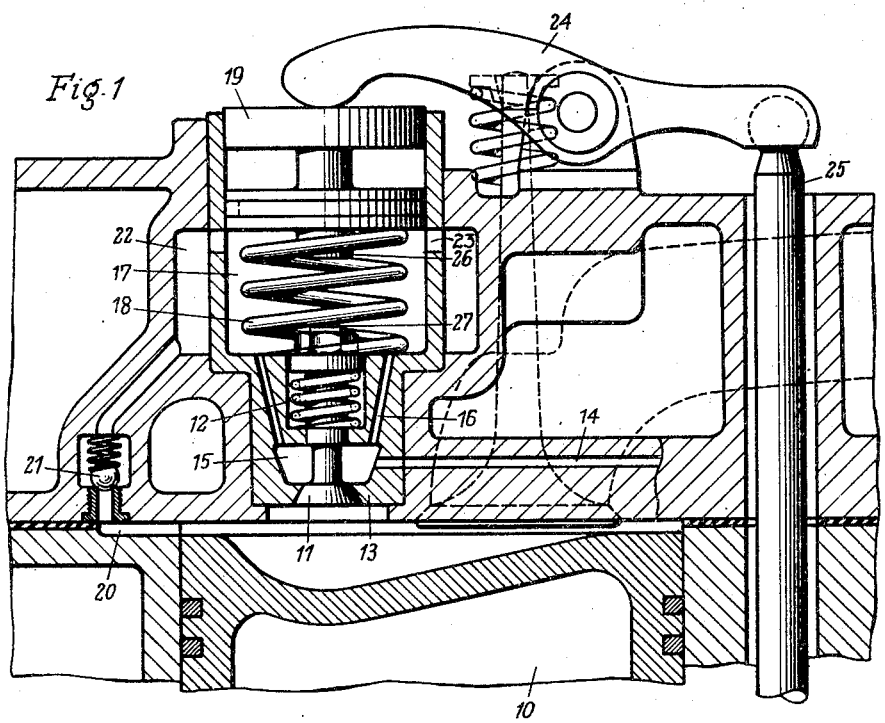
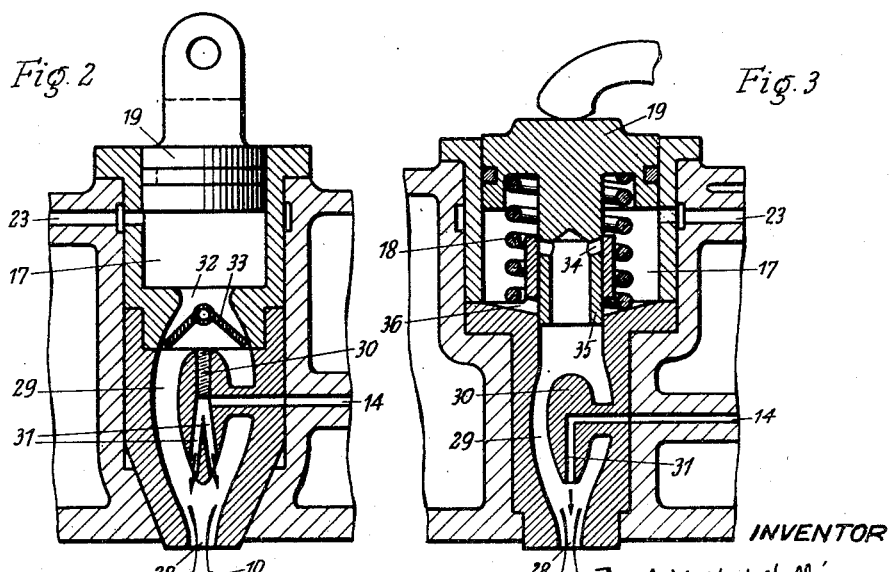
INVENTOR
Friedrich K. H. Nallinger
By Dicke and Padlon
Attorneys

2,710,600

AIR INJECTION SYSTEM FOR INTERNAL COMBUSTION ENGINES

Friedrich K. H. Nallinger, Stuttgart, Germany, assignor to Daimler-Benz Aktiengesellschaft, Stuttgart-Unterturkheim, Germany Application May 31, 1951, Serial No. 229,017

Claims priority, application Germany May 31, 1950

6 Claims. (Cl. 123—33)

The present invention relates to air injection of fuel in internal combustion engines, particularly in internal combustion engines having cylinders of small piston displacement.

Solid injection of fuel in cylinders of small piston displacement causes considerable difficulties on account of the very small diameter of the nozzle orifices necessary for injecting the very small quantities of fuel required in engines of this kind. This is especially true in engines having multiple orifice injection nozzles with correspondingly still smaller diameter of the individual orifice of the nozzle. On the one hand, these small orifices are very difficult to machine and to calibrate and, on the other hand, they have a tendency to clog easily.

Air injection systems of the heretofore used type have the disadvantage that a very high air pressure is required to insure a proper atomization of the fuel. Air injection system of the conventional type therefore require complicated compressor equipment and are expensive to manufacture.

The principal object of the present invention is to provide an air injection system supplying air at the required high pressure more simply and more economically and at a higher efficiency than conventional air injection systems.

This object is attained by locating in the immediate vicinity of the injection valve or of the injection nozzle the means for raising the air pressure to the high pressure required for properly injecting the fuel. Preferably these air compressor means, which hereinafter will be referred to as "injection compressor", and the injection nozzle will be combined in a unitary structure, in which the piston of the injection compressor is preferably arranged coaxially with the injection nozzle. The air compressed by this injection compressor may already have been previously compressed to a certain extent, so that the pressure rise effected by the injection compressor may be compared to the final pressure rise effected in the last stage of a multistage compressor. This previously compressed air may also be furnished by one or a plurality of the engine cylinders themselves.

Locating the injection compressor immediately adjacent to the injection valve facilitates the timing of this compressor in relation to the beginning of the injection period in such a way that the injection will occur when the injection air has been compressed to the predetermined injection pressure.

It will be found expedient to actuate the injection compressor by the camshaft in four stroke cycle engines and by the crankshaft in two stroke cycle engines by means of suitable push rods, rocker arms or other suitable mechanism.

Fuel will preferably be delivered to the nozzle at a higher pressure than injection air. The fuel may be pumped in measured quantities into a passage connecting the compressor cylinder with the nozzle orifice so as to be driven into the engine cylinder by the air blast when the nozzle valve opens or it may be inducted or drawn directly into the moving air stream, particularly if an open type nozzle is being used. A separate fuel pump or a fuel injection pump may be used for this purpose. Fuel pump and nozzle may also be united to an injector unit.

It is particularly desirable to inject the fuel into the air stream at a place where the air stream is being accelerated, so that there exists a difference in velocity between the air and the fuel which is also being accelerated to a certain degree. This process of accelerating the air stream is preferably continuous throughout the passage leading from the compressor cylinder to the nozzle orifice. The fuel is thereby broken up into small particles and is finely atomized. The pressure of the fuel will only have to be slightly higher than that of the air, and the pressure of the air may also be relatively low. Furthermore small nozzle orifices are avoided so that there will be no difficulties with clogged orifices.

Several embodiments of the invention are shown in the accompanying drawings of which:

Fig. 1 shows a schematic view of an injection compressor combined with a nozzle having a spring loaded nozzle valve in accordance with the present invention, Fig. 2 shows a schematic view of an injection air compressor in combination with an open type injection nozzle including an automatically operated air valve as well as an air passage through the nozzle which is so designed as to accelerate the air stream within the nozzle, and Fig. 3 shows an air injection system similar to the one shown in Fig. 2, the discharge of air from the compressor cylinder being controlled by the compressor piston in this embodiment.

In Fig. 1 the numeral 10 designates the combustion chamber of an engine cylinder and 11 the nozzle valve. The nozzle valve 11 opens in the direction towards the engine piston and is biassed by a spring 12 tending to force the valve against its seat 13. Fuel metered by a fuel pump (not shown) enters a chamber 15 through line 14, this nozzle chamber 15 being in communication with the compressor cylinder 17 by means of passages 16. Air under pressure flows from the engine cylinder through line 20, check valve 21, receiver 22 and line 23 into the compressor cylinder 17 where it is compressed by the compressor piston 19 which is biassed by spring 18. The receiver 22 may also be in communication with the compressor cylinders of other engine cylinders.

The piston 19 is actuated by rocker arm 24, which in turn is actuated in four stroke cycle engines by the engine camshaft and in two stroke cycle engines by the engine crankshaft by means of push rod 25 or other suitable mechanism. The bottom side of piston 19 is provided with a downward projecting boss 26 which comes into abutment with the end face 27 of the stem of the nozzle valve 11.

A portion of the air compressed by the upward stroke of the engine piston in the engine cylinder 10 passes through 20, 21, 22 and 23 into the compressor cylinder 17. Towards the end of the upstroke or compression stroke of the engine piston or a short time prior to the beginning of injection, the fuel is delivered to the nozzle chamber 15. Downward movement of the compressor piston 19 starts about simultaneously with the fuel delivery, cutting off communication between 22 and 17 so that the air trapped in the compressor cylinder may be further compressed on the downward movement of the piston 19.

The biasing spring 12 of the nozzle valve 11 is so designed that it keeps the valve on its seat against the rising air pressure. When a predetermined pressure rise of the air in cylinder 17 has been attained, valve 11 is opened by the boss 26 at the desired moment of the beginning of the injection. The fuel in nozzle chamber 15 is then injected by the injection air into the engine cylinder.

Fig. 2 as well as Fig. 3 show a nozzle with an orifice 28 which is always open. A streamlined body 30 located within the passage 29 leading from the cylinder 17 to the nozzle orifice 28 is connected with fuel line 14, and one or more bores 31 are provided in this body for discharging fuel into the nozzle passage 29. The passage 29 is so designed that its cross sectional area of flow gradually decreases towards the nozzle orifice so that the air flowing through this passage will be continuously accelerated.

Compressed air furnished either by a separate compressor (not shown) at a comparatively low pressure or by the engine piston in the manner shown in Fig. 1 enters the cylinder 17 of the injection compressor through passage 23, the opening and closing of passage 23 being controlled by the compressor piston 19 which may be actuated by a rocker arm working in conjunction with a spring 18 as shown in Fig. 3 or may be linked to a suitable drive mechanism (not shown) as indicated in Fig. 2.

In the embodiment shown in Fig. 2 the compressor cylinder 17 is in communication with nozzle passage 29 through opening 32. Automatically operating valve means, for instance, the spring loaded valve 33, are provided to control the flow of air from opening 32. As long as the air pressure in cylinder 17 remains below the predetermined injection pressure, valve 33 will not open. However, if at the end of the compression stroke the predetermined injection pressure will have been attained, valve 33 will open and injection air will flow through passage 29 and orifice 28 into the engine cylinder 10, the flow of the injection air being accelerated by the above referred to gradual decrease in cross sectional area of passage 29. Fuel will be injected through bores 31 into the air stream in timed relation with the air flow, a fine atomization of the fuel being insured by the difference in velocity between the fuel and the accelerated air stream.

The embodiment shown in Fig. 3 differs from the one shown in Fig. 2 in that the air flow from the compressor cylinder to the passage 29 is controlled by the lower portion 35 of the compressor piston, said lower portion 35 being designed as a hollow piston of smaller diameter than the upper portion of the compressor piston and being provided with ports 34 coming into registration with ports 36 at the lower end of the cylinder 17 when the downward movement of the compressor piston has raised the air pressure to the desired injection pressure. The injection air may now flow from cylinder 17 through ports 34 and 36 into the passage 29 where it will commingle with fuel discharged from bore 31 in timed relation with the release of the injection air, the fuel being discharged under a somewhat higher pressure than the injection air.

The invention is not limited to the embodiments shown. The features described and claimed may be combined in various other ways. The invention is applicable to diesel engines of all types, particularly engines operating with direct injection. It may, however, also be used in injection engines operating on lighter grade fuels such as gasoline. The invention is equally suited for use in vehicle engines, marine engines and stationary engines.

What I claim is:

1. Air injection system for internal combustion engines, comprising in combination a main combustion chamber, a compressor chamber provided with air inlet means and a compressor member for compressing the air in said compressor chamber, a communicating passage connecting said compressor chamber with said combustion chamber provided with control means closing said compressor chamber against said communicating passage and providing a connection therebetween with increased pressure in said compressor chamber, said communicating passage having a nozzle-like streamlined shape with an essentially continuously varying cross section decreasing in the direction of the nozzle thereof, a substantially central member in said passage, and a fuel feed line terminating in said central member and discharging therefrom in the direction of said main combustion chamber whereby the air flowing through said passage with continuous acceleration receives substantially centrally thereof the fuel from said central member discharged essentially in the same direction toward said main combustion chamber.

2. An air injection system for internal combustion engines according to claim 1, wherein said control means is formed by openings provided in said compressor member cooperating with corresponding openings provided in the walls of said compressor chamber.

3. An air injection system for internal combustion engines according to claim 1, wherein said control means is independent of said compressor member, said control means being operative to close the connection of said compressor chamber with said passage at relatively slight pressures in said compressor chamber and to establish said last-mentioned connection with relatively high pressures in said compressor chamber.

4. An air injection system for internal combustion engines according to claim 1, further comprising an additional communicating passage connecting said main combustion chamber with said compressor chamber, and means for establishing a connection between said additional communicating passage and said compressor chamber with said compressor member in the position thereof corresponding to relatively slight pressure in said compressor chamber and for interrupting said last-mentioned connection with said compressor member in a position corresponding to relatively high pressure in said compressor chamber.

5. An air injection system for internal combustion engines according to claim 1, wherein said compressor chamber is disposed substantially coaxially with said communicating passage to conduct the air displaced by said compressor member with steady acceleration into said main combustion chamber through said communicating passage free of any essential bends while bypassing said central member in a substantially annular-like manner.

6. An air injection system for internal combustion engines according to claim 1, wherein said central member is rounded off on all sides thereof to provide together with the wall forming said communicating passage an annular passage of continuous streamlined contour along the inner and outer part thereof.

References Cited in the file of this patent

UNITED STATES PATENTS

| | | |
|---|---|---|
| 1,445,791 | Muller | Feb. 20, 1923 |
| 1,475,370 | Danckwortt | Nov. 27, 1923 |
| 1,679,818 | Enright | Aug. 7, 1928 |
| 1,766,389 | Kramling | June 24, 1930 |
| 1,826,535 | Thomas | Oct. 6, 1931 |
| 1,950,944 | Lacoe | Mar. 13, 1934 |
| 2,033,155 | Scott | Mar. 10, 1936 |
| 2,091,987 | Honn | Sept. 7, 1937 |
| 2,103,595 | Nelson | Dec. 28, 1937 |
| 2,146,139 | Greene | Feb. 7, 1939 |